United States Patent
Zhu et al.

(10) Patent No.: US 11,884,830 B2
(45) Date of Patent: Jan. 30, 2024

(54) BASE-CATALYZED SOL-GEL INKS FOR DIRECT INK WRITING OF HIGH RESOLUTION HIERARCHICALLY POROUS CARBON AEROGELS

(71) Applicant: Lawrence Livermore National Security, LLC, Livermore, CA (US)

(72) Inventors: Cheng Zhu, Livermore, CA (US); Eric Duoss, Dublin, CA (US); Christopher Spadaccini, Oakland, CA (US); Marcus A. Worsley, Hayward, CA (US); Jianchao Ye, Tracy, CA (US); Swetha Chandrasekaran, Dublin, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 390 days.

(21) Appl. No.: 16/772,627

(22) PCT Filed: Mar. 22, 2019

(86) PCT No.: PCT/US2019/023553
§ 371 (c)(1),
(2) Date: Jun. 12, 2020

(87) PCT Pub. No.: WO2019/183461
PCT Pub. Date: Sep. 26, 2019

(65) Prior Publication Data
US 2021/0087419 A1 Mar. 25, 2021

Related U.S. Application Data

(60) Provisional application No. 62/647,487, filed on Mar. 23, 2018.

(51) Int. Cl.
*C09D 11/38* (2014.01)
*C09D 11/103* (2014.01)
(Continued)

(52) U.S. Cl.
CPC .............. *C09D 11/38* (2013.01); *C08K 3/042* (2017.05); *C08K 3/22* (2013.01); *C09D 11/03* (2013.01);
(Continued)

(58) Field of Classification Search
CPC ........ C09D 11/00; C09D 11/38; C09D 11/103
See application file for complete search history.

(56) References Cited

U.S. PATENT DOCUMENTS 6,140,391 A    10/2000  Zou et al.
10,767,062 B2   9/2020  Chandrasekaran et al.
(Continued)

FOREIGN PATENT DOCUMENTS

WO    2017029673 A1   2/2017
WO    2017079130 A1   5/2017

OTHER PUBLICATIONS

Duoss et al., "Sol-Gel Inks for Direct-Write Assembly of Functional Oxides," Advanced Materials, vol. 19, 2007, pp. 3485-3489.
(Continued)

*Primary Examiner* — Khanh T Nguyen
(74) *Attorney, Agent, or Firm* — Zilka-Kotab, P.C.

(57) ABSTRACT

According to one aspect of an inventive concept, an ink includes a base catalyst, a sol gel precursor composition, and a block copolymer. According to another aspect of an inventive concept, an aerogel includes a three-dimensional printed structure having printed ligaments geometrically arranged, where an average diameter of the printed ligaments is in a range of greater than 0 microns and less than 50 microns. In addition, an average distance between a center of a first of the printed ligaments and a center of a second of the printed ligaments is at least equal to the average diameter of the printed ligaments, where the first and the second of the printed ligaments are adjacent. Each
(Continued)

printed ligament includes of a plurality of random pores, where an average diameter of the random pores is less than 50 nanometers.

18 Claims, 3 Drawing Sheets

(51) Int. Cl.
| | | |
|---|---|---|
| *C08K 3/04* | (2006.01) | |
| *C08K 3/22* | (2006.01) | |
| *C09D 11/03* | (2014.01) | |
| *C09D 11/324* | (2014.01) | |
| *B82Y 30/00* | (2011.01) | |
| *B82Y 40/00* | (2011.01) | |

(52) U.S. Cl.
CPC .......... *C09D 11/103* (2013.01); *C09D 11/324* (2013.01); *B82Y 30/00* (2013.01); *B82Y 40/00* (2013.01)

(56) References Cited

U.S. PATENT DOCUMENTS

| | | |
|---|---|---|
| 2004/0241237 A1 | 12/2004 | Pirard et al. |
| 2006/0171990 A1 | 8/2006 | Asgari |
| 2007/0167534 A1 | 7/2007 | Coronado et al. |
| 2008/0044575 A1 | 2/2008 | Mirkin et al. |
| 2009/0110843 A1 | 4/2009 | Halahmi et al. |
| 2013/0084449 A1* | 4/2013 | Lewis .................... A61L 27/52 428/221 |
| 2013/0237646 A1 | 9/2013 | Harders et al. |
| 2015/0024122 A1 | 1/2015 | Wu et al. |
| 2016/0067891 A1 | 3/2016 | Worsley et al. |
| 2018/0251645 A1 | 9/2018 | Magdassi et al. |
| 2018/0320008 A1 | 11/2018 | Fedynyshyn et al. |
| 2018/0345598 A1 | 12/2018 | Chandrasekaran et al. |
| 2020/0298466 A1 | 9/2020 | Liang et al. |

OTHER PUBLICATIONS

International Search Report and Written Opinion from PCT Application No. PCT/US2019/23553, dated Aug. 7, 2019.
International Preliminary Examination Report from PCT Application No. PCT/US2019/23553, dated Oct. 8, 2020.
Liang et al., U.S. Appl. No. 16/362,450, filed Mar. 22, 2019.
Restriction Requirement from U.S. Appl. No. 16/362,450, dated May 28, 2021.
Non-Final Office Action from U.S. Appl. No. 16/362,450, dated Jan. 21, 2022.
Final Office Action from U.S. Appl. No. 16/362,450, dated May 9, 2022.
Liu et al., "Triconstituent Co-assembly to Ordered Mesostructured Polymer-Silica and Carbon-Silica Nanocomposites and Large-Pore Mesoporous Carbons with High Surface Areas," JACS Articles, Aug. 10, 2006, pp. 11652-11662.
International Search Report and Written Opinion from PCT Application No. PCT/US2020/023844, dated Aug. 7, 2020.
International Preliminary Examination Report from PCT Application No. PCT/US2020/023844, dated Oct. 7, 2021.
Lee et al., "Simple Synthesis of Uniform Mesoporous Carbons with Diverse Structures from Mesostructured Polymer/Silica Nanocomposites," Chemistry of Materials, vol. 16, 2004, pp. 3323-3330.

* cited by examiner

US 11,884,830 B2

BASE-CATALYZED SOL-GEL INKS FOR DIRECT INK WRITING OF HIGH RESOLUTION HIERARCHICALLY POROUS CARBON AEROGELS

The United States Government has rights in this invention pursuant to Contract No. DE-AC52-07NA27344 between the United States Department of Energy and Lawrence Livermore National Security, LLC for the operation of Lawrence Livermore National Laboratory.

FIELD OF THE INVENTION

The present invention relates to additive manufacturing of porous carbon aerogels, and more particularly, this invention relates to base-catalyzed sol-gel inks for direct ink writing of high resolution hierarchically porous carbon aerogels.

BACKGROUND

Macro-structured and meso-structured carbon-based materials with hierarchical porosity have found wide applications in catalysis, energy storage, biomedical scaffolds, and sorbents due to their good electrical conductivity, high surface area, and excellent chemical stability. These unique properties are intrinsically determined by their structural hierarchies with 3D interconnected multi-scale network.

Previously, several bulk porous carbons, such as aerogels, foams, or macro-assemblies have been synthesized using traditional templating or hydrothermal methods. However, the performance of these materials is still limited by random and unpredictable pore size and distribution. Recently, novel 3D printing techniques have been utilized to create periodic macro-architecture carbon materials with resolution >100 μm. Here, we develop a new particle-free sol-gel ink using base-catalyst derived R-F reaction to print high resolution macro- (<100 μm) 3D carbon aerogels with combined mesopores and micropores.

SUMMARY

According to one aspect of an inventive concept, an ink includes a base catalyst, a sol gel precursor composition, and a block copolymer.

According to another aspect of an inventive concept, an aerogel includes a three-dimensional printed structure having printed ligaments geometrically arranged, where an average diameter of the printed ligaments is in a range of greater than 0 microns and less than 50 microns. In addition, an average distance between a center of a first of the printed ligaments and a center of a second of the printed ligaments is at least equal to the average diameter of the printed ligaments, where the first and the second of the printed ligaments are adjacent. Each printed ligament includes of a plurality of random pores, where an average diameter of the random pores is less than 50 nanometers. An average diameter of the random pores located on a surface of the printed ligaments is substantially equal to an average diameter of random pores located throughout an inside area of each of the printed ligaments, where the inside area is located between each surface of each of the printed ligaments.

Other aspects and advantages of the present invention will become apparent from the following detailed description, which, when taken in conjunction with the drawings, illustrate by way of example the principles of the invention.

DETAILED DESCRIPTION

Figure 1:
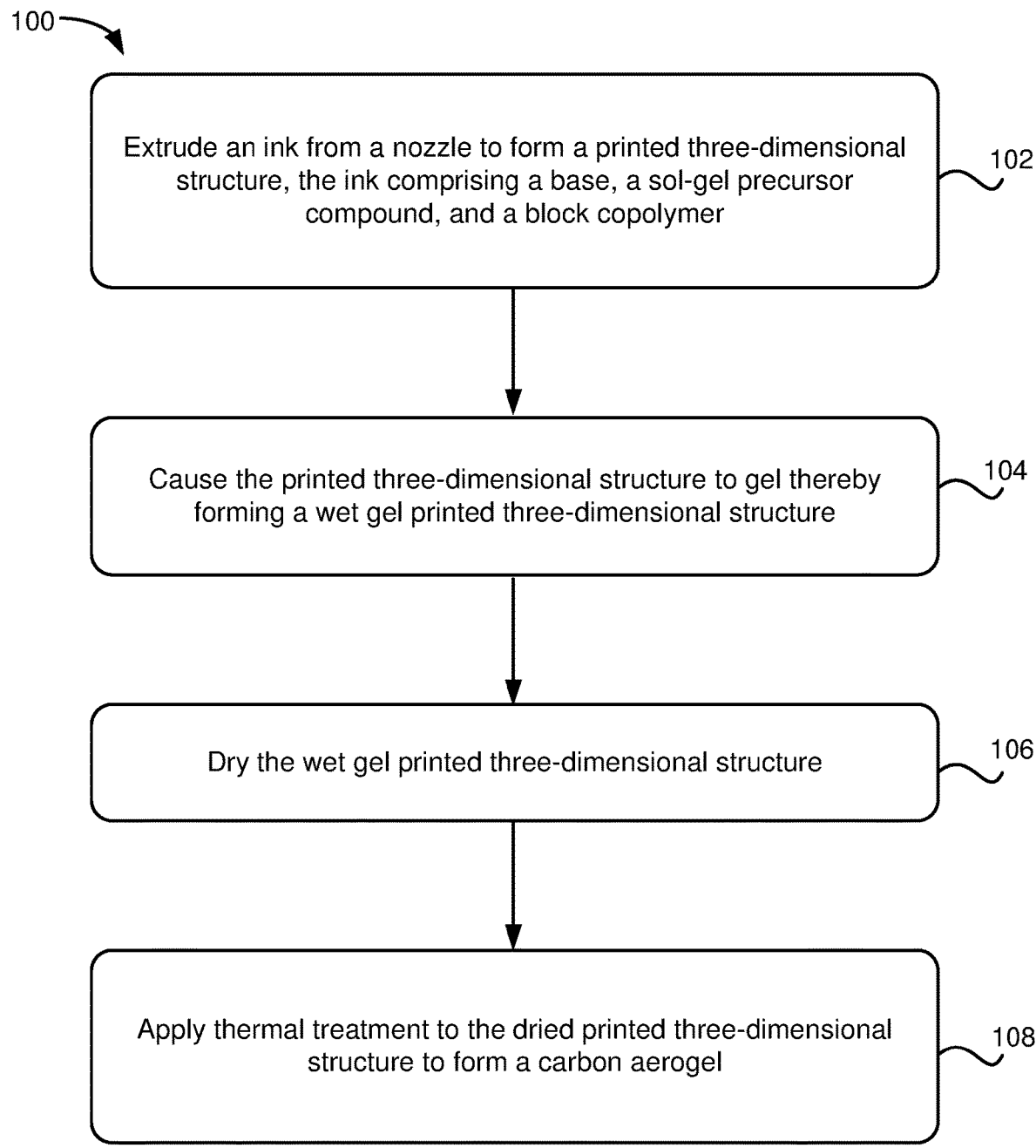
FIG. 1 is a flow chart of a method, according to one aspect of an inventive concept.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

As also used herein, the term "about" when combined with a value refers to plus and minus 10% of the reference value. For example, a length of about 1 μm refers to a length of 1 μm±0.1 μm.

It is also noted that, as used in the specification and the appended claims, wt % is defined as the percentage of weight of a particular component is to the total weight of the mixture. Moreover, mol % is defined as the percentage of moles of a particular component is to the total moles of the mixture.

The present disclosure describes formation of material with pores of varying sizes. For the purposes of this disclosure, mesoscale pores, also known as mesopores, are defined as having a diameter in a range of about 2 nanometers (nm) to about 50 nm, microscale pores, also known as micropores, are defined as having a diameter in a range of greater than 0 nm to less than about 2 nm. Macroscale pores, also known as macropores, are defined as having a size greater than 50 nm. Mesoporosity refers to a characteristic of a material having pores with a diameter of mesoscale. Microporosity refers to a characteristic of a material having pores with diameter of microscale. Macro-periodic porosity refers to a characteristic of a material having pores with diameters of macroscale.

The present disclosure includes several descriptions of exemplary "inks" used in an additive manufacturing process to form the hierarchical architecture described herein. It should be understood that "inks" (and singular forms thereof) may be used interchangeably and refer to a composition of matter such that the composition of matter may be "written," extruded, printed, or otherwise deposited to form a layer that substantially retains its as-deposited geometry and shape without excessive sagging, slumping, or other deformation, even when deposited onto other layers of ink, and/or when other layers of ink are deposited onto the layer. As such, skilled artisans will understand the presently described inks to exhibit appropriate rheological properties to allow the formation of monolithic structures via deposition of multiple layers of the ink (or in some cases multiple inks with different compositions) in sequence.

The following description discloses several preferred structures formed via direct ink writing (DIW), extrusion freeform fabrication, or other equivalent techniques and therefore exhibit unique structural and compositional characteristics conveyed via the precise control allowed by such techniques.

The following description discloses several preferred inventive concepts of high resolution hierarchically porous aerogels and/or related systems and methods.

According to one general aspect of an inventive concept, an ink includes a base catalyst, a sol gel precursor composition, and a block copolymer.

According to another general aspect of an inventive concept, an aerogel includes a three-dimensional printed structure having printed ligaments geometrically arranged, where an average diameter of the printed ligaments is in a range of greater than 0 microns and less than 50 microns. In addition, an average distance between a center of a first of the printed ligaments and a center of a second of the printed ligaments is at least equal to the average diameter of the printed ligaments, where the first and the second of the printed ligaments are adjacent. Each printed ligament includes of a plurality of random pores, where an average diameter of the random pores is less than 50 nanometers. An average diameter of the random pores located on a surface of the printed ligaments is substantially equal to an average diameter of random pores located throughout an inside area of each of the printed ligaments, where the inside area is located between each surface of each of the printed ligaments.

A list of acronyms used in the description is provided below.

| | |
|---|---|
| 3D | Three-dimensional |
| AM | Additive manufacturing |
| C. | Celsius |
| DIW | Direct Ink Writing |
| nm | nanometer |
| μm | micron |
| SEM | Scanning electron microscopy |
| Wt % | weight percent |

According to various inventive concepts, a particle-free ink with appropriate rheological behavior for three-dimensional (3D) printing with a sub-100 μm diameter nozzle results in printing 3D porous structures with controlled architectures. According to one inventive concept, a method is described for fabricating porous carbon aerogels with engineered hierarchical architectures with high resolution. In various approaches, a design of a structure having a specific architecture is created, then the predesigned structure is printed with a sol-gel ink using methods described herein thereby forming a 3D structure having an architecture with predefined macro-periodic porosity. In some approaches, as shown in FIG. 2(e), an organic aerogel is formed having a 3D architecture with predefined macro-periodic porosity and the organic aerogel material having random microporosity and mesoporosity. In exemplary approaches as shown in FIG. 2(f), a carbon aerogel is formed having a 3D architecture with predefined macro-periodic porosity containing primary carbon particles with random microporosity and mesoporosity following gelation, drying, and carbonization of the 3D structure. Accordingly, methods described herein form an aerogel of hierarchical porosity having an architecture with predefined macroscale pores and having random mesoscale and microscale pores throughout the aerogel material.

In this method, a new particle-free base-catalyzed sol-gel ink may be used for direct-ink writing (DIW) into 3D periodic porous structures. According to various aspects of the inventive concept described herein, the ink materials used for DIW may be prepared by dissolving resorcinol and formaldehyde into sodium carbonate solution, and adding tri-block copolymer with varying concentrations to achieve a desired physical characteristics. Physical characteristics of the ink include rheology, material composition and porosity distribution at a desired location in the product following post-printing processing. Post-printing processing of a 3D printed part may include supercritical drying and heat treatment to remove residual organics while simultaneously carbonizing the 3D printed product to an aerogel. The methods described herein may achieve high resolution printing to fabricate hierarchical porous carbon aerogels that are not achieved by traditional process or other 3D printing techniques. Various aspects of the inventive concepts described herein identify materials and methods by which to prepare custom-tailored 3D printable silicone materials through DIW processes.

Furthermore, custom formulations prepared according to the teaching herein unlock the ability to control the porosity and structural engineering of particle-free materials for a resulting carbonaceous aerogel. In various approaches, the carbonaceous aerogel has predefined non-random pores according to an engineered design. In some approaches, the predefined non-random pores of the aerogel may have a diameter of less than about 50 μm. In exemplary approaches, the predefined non-random pores of the aerogel may have a diameter of less than about 10 μm. In some approaches, ligaments of the aerogel may have fine resolutions, e.g. a diameter less than 50 μm, a diameter of less than 10 μm in post-processing techniques that include shrinkage, etc.

In various aspects of the inventive concepts described herein, particle-free inks may be prepared with a proper rheology for 3D printing in which structures with predefined dimensions are formed. One aspect of the inventive concepts described herein encompasses a particle-free ink with the ideal rheology for 3D printing with sub-100 μm diameter nozzle, which may be custom formulated to yield a wide range of physical properties applicable to a variety of fields and industries.

In one approach, an ink includes a base catalyst, a sol gel precursor composition, and a block copolymer.

In preferred approaches, the base catalyst may be a weak base. Exemplary examples of a weak base include sodium carbonate, ammonium carbonate, sodium bicarbonate, hexamethylenetetramine, etc. In other approaches the base catalyst may be a strong base. Examples of a strong base may include sodium hydroxide, calcium hydroxide, ammonium hydroxide, etc.

In an exemplary approach, a base catalyst is made by dissolving sodium carbonate powder in water.

In preferred approaches, ink may contain a sol-gel precursor composition. In some approaches, the sol-gel precursor composition includes a hydroxyl benzene, an aldehyde, and a solvent. In some approaches, the sol-gel precursor composition may be a resorcinol formaldehyde compound. In other approaches, the ink may contain a sol-gel precursor composition that includes phenol formaldehyde, melamine formaldehyde, cresol formaldehyde, phenol furfuryl alcohol, polyacrylamides, polyacrylonitriles, polyacrylates, polycyanurates, polyfurfural alcohol, polyimides, polystyrenes, polyurethanes, polyvinyl alcohol dialdehyde, epoxies, agar agar, agarose, etc.

In an exemplary approach, a formulation of resorcinol formaldehyde is continuously added into the solution of base catalyst, e.g. sodium carbonate, to form an ink having homogenous dilute sol.

In some approaches, a ratio of the sol gel precursor composition to the base catalyst may be in a range of about 10 parts sol gel precursor composition to 1 part base catalyst (10:1) to about 1000 parts sol gel precursor composition to 1 part base catalyst (1000:1). In preferred approaches, resorcinol (R) may be added to the base catalyst (C) in a ratio of 10 parts resorcinol to one part sodium carbonate (10:1 R:C). In other approaches, the R:C ratio may be as high as 1000:1 R:C, but could be higher or lower. As would be understood by one skilled in the field of sol-gel chemistry, the ratio of resorcinol to base catalyst may be determined relative to the change in morphology of the pores relative to the concentration of each component.

In some approaches, a concentration of the sol-gel precursor composition may be in a range of about 1 wt % to about 40 wt % of total weight of the ink. In some approaches, the range of concentration of RF may be between 1 wt % to 2 wt % RF in water up to the solubility limit of RF, to about 40 wt % in water, but could be higher or lower. As would be understood by one skilled in the art of sol-gel chemistry, the RF is formed by dissolving resorcinol in water to a desired concentration, and then formaldehyde may be added dropwise to the resorcinol in water until the desired concentration (wt % RF in water) is achieved.

In various approaches, the ink may contain a block copolymer as a component to modify the rheology of the ink. In some approaches, a block copolymer may add viscosity to the ink. In preferred approaches, the block copolymer may have chemical compatibility with a base-catalyzed sol-gel process. In some approaches, the modifications of the rheology by the block copolymer may depend on the temperature of the process. In some approaches, the ink may contain a block copolymer to define the material composition of the ink and resulting carbon aerogel. In some approaches, the ink may contain a block copolymer to generate specific porosity distribution.

In some approaches, the ink may contain an effective amount of block copolymer to modify rheology such that the ink has an optimal viscosity to be extruded from a nozzle during DIW printing, preferably from a nozzle with a sub-100 μm diameter. The effective amount of the block copolymer is an amount that imparts the desired function or result, and may be readily determined without undue experimentation following the teachings herein and varying the concentration of the additive, as would become apparent to one skilled in the art upon reading the present description.

In some approaches, the ink may contain a concentration of block copolymer in a range of 20 wt % to about 60 wt %. of the total weight of the ink. In exemplary approaches, the ink may contain a concentration of block copolymer in a range of about 30 wt % to about 50 wt % of the total weight of the ink, but the concentration could be higher or lower.

In some approaches, the block copolymer may include a triblock copolymer. In preferred approaches, the ink may contain a block copolymer such as a triblock copolymer. Illustrative examples of triblock copolymer include Pluronic F127, Pluronic F68, Pluronic F108, Pluronic P84.

In an exemplary approach, the ink may contain a triblock copolymer that is thermoreversible (e.g. Pluronic F127). In some approaches, the thermoreversible triblock copolymer may be used as a viscosifier to increase the viscosity of the ink. The thermoreversible triblock copolymer may impart a high viscosity and yield strength for optimal suitability of the ink for 3D printing. In some approaches, a thermoreversible triblock copolymer has a characteristic of reversing self-assembly with heat, and thus the triblock copolymer may be removed from the 3D structure.

In preferred approaches, the ink for 3D printing is essentially free of particles. For the purposes of this disclosure a particle may be defined as solid matter with an average diameter greater than about 5 nanometers (nm). In various approaches, the ink for 3D printing does not include any solid matter (e.g., with an average diameter greater than about 5 nm), and thus the ink does not clog the nozzle during 3D printing. In some approaches, the ink for 3D printing may not include particles having an average diameter less than 1 nm.

In some approaches, the ink may include a metal oxide precursor. In one approach, the metal oxide precursor may be a metal salt. In various approaches, the metal oxide precursor may be copper nitride, cobalt, nitride, nickel nitrate, iron nitrate, etc.

In one approach, a second ink may be added to the ink. In one approach, the second ink may include graphene.

FIG. 1 shows a method 100 for additive manufacturing with particle-free ink to form an aerogel, in accordance with one aspect of the inventive concepts described herein. As an option, the present method 100 may be implemented to construct structures such as those shown in the other FIGS. described herein. Of course, however, this method 100 and others presented herein may be used to form structures for a wide variety of devices and/or purposes which may or may not be related to the illustrative aspects listed herein. Further, the methods presented herein may be carried out in any desired environment. Moreover, greater or fewer operations than those shown in FIG. 1 may be included in method 100, according to various aspects of inventive concepts described herein. It should also be noted that any of the aforementioned features may be used in any of the aspects described in accordance with the various methods.

According to one aspect of an inventive concept, the method 100 of forming an aerogel begins with step 102 involving extruding an ink from a nozzle to form a three-dimensional structure. The ink may include a base catalyst, a sol-gel precursor compound, and a block copolymer. In some approaches the sol-gel precursor composition may include a hydroxyl benzene and an aldehyde in a solvent.

In this and other approaches, the nozzle may be a cartridge. The ink may be formed in the nozzle, where one or more of the components is added to the nozzle separately from the other components. A mixer may provide mixing of the ink within the nozzle. In another approach, the ink may be premade and fed to the nozzle.

In some approaches for forming a structure with increased capacitance (e.g. for using the material in a battery), step 102 may include adding a metal salt (e.g., a metal oxide precursor) to the ink. Alternatively, a metal oxide precursor, e.g., metal salt, may be part of a premade mixture that is fed through the cartridge and mixed with the ink prior to extrusion through a nozzle.

In some approaches, step 102 may include adding a second ink to the particle-free ink, where the second ink may include particles. In one approach, the second ink may be graphene. Alternatively, the second ink may be part of a premade mixture that is fed through the cartridge.

In various approaches, the presence of a rheology modifying additive, for example a triblock copolymer, imparts pseudoplasticity to the particle-free ink such that the compression stress of the ink in the cartridge allows the ink to be extruded from the cartridge during 3D printing. In various approaches, the method of 3D printing is an extrusion-based 3D printing technique. In an exemplary approach, the method of 3D printing is direct ink writing (DIW).

In various approaches, the ink is extruded through a nozzle. In some approaches, the nozzle may have a diameter in a range of less than 500 microns (μm) to greater than 25 μm. In some approaches, the ink may be extruded through a nozzle having a diameter of about 250 μm or less. In some approaches, the ink may be extruded through a nozzle having a diameter in a range of less than 200 μm and greater than 25 μm. In an exemplary approach, the ink may be extruded through a nozzle with a diameter of about 100 μm or less.

In various approaches of a 3D printing process, the ink is deposited onto a substrate to a manufactured designed architecture. Using an extrusion-based printing process, the ink may be loaded into a cartridge, shear force may be applied to the ink such that the ink is extruded through a nozzle onto a substrate. The pattern of the extruded ink on the substrate may be a plot of a predefined architecture. In some approaches, the substrate is sacrificial. The manufactured designed architecture may be defined before printing by various methods, such as computer-aided design, etc. In various approaches the predefined architecture of the 3D printing part may be retained throughout the method as described herein.

Step 104 of method 100 includes causing the printed three-dimensional structure to gel thereby forming a wet gel printed three-dimensional structure. In various approaches, the printed 3D structure of sol-gel mixture may be immersed in an organic solvent and heated at an elevated temperature to cause formation of a wet gel. The organic solvent may be immiscible with water such that the organic solvent has a lower density than water, e.g. iso-octane. In some approaches, step 104 may include heating the structure immersed in organic solvent to temperatures about 80° C. in a sealed container until gelation of the structure. In various other approaches, methods generally understood by one skilled in the art may be used to cause the structure to form a sol-gel.

Step 106 of method 100 includes drying the wet gel printed 3D structure to form a precursor aerogel. In some approaches, the wet gel printed 3D structure obtained in step 104 may be rinsed in solvent (e.g. acetone) and supercritically dried to form a dried aerogel. In various other approaches, methods generally understood by one skilled in the art may be used to dry the wet gel structure to form a dried aerogel.

Step 108 of method 100 includes applying thermal treatment to the dried printed 3D structure to form a carbon aerogel having a predefined porous macrostructure. In some approaches, the dried structure obtained in step 106 may be carbonized by heating at high temperatures (e.g. 1050° C.) to remove residual organic components simultaneously as the structure is carbonized to a carbon aerogel structure. In various approaches, the predefined porous macrostructure includes the formed carbon aerogel material having a random combination of mesopores and micropores.

In some aspects of the inventive concepts described herein, the direct application of additive manufacturing using particle free inks allows direct ink writing with sub-100 μm diameter nozzles. Moreover, various methods described herein allow engineering of high resolution printing to fabricate hierarchical porous carbon aerogels.

Figure 2:
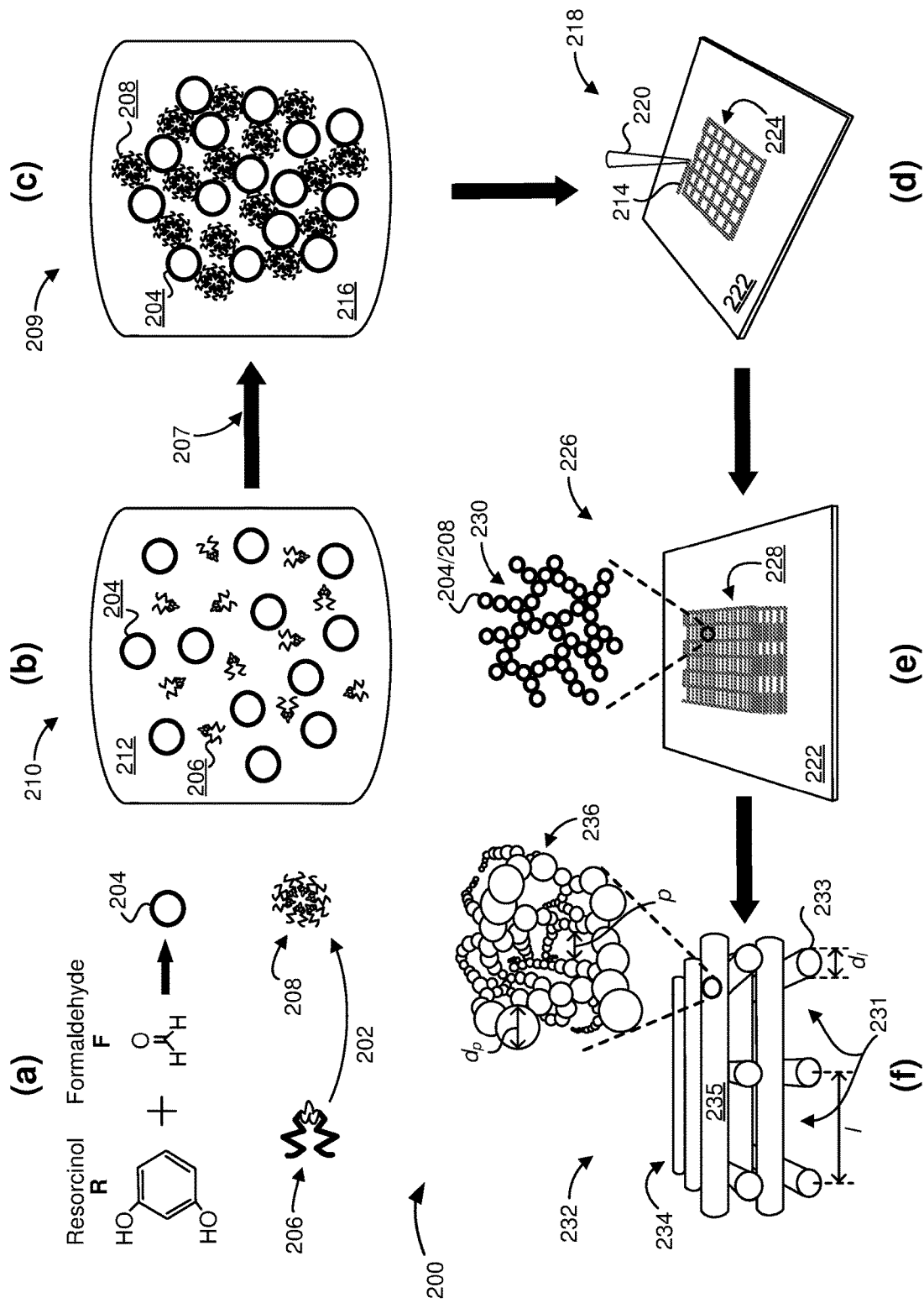
FIG. 2 is a schematic drawing of a method and a product, according to one aspect of an inventive concept.

FIG. 2 shows a method 200 for forming an aerogel 234, in accordance with one aspect of the inventive concepts described herein. As an option, the present method 200 may be implemented to construct structures such as those shown in the other FIGS. described herein. Of course, however, this method 200 and others presented herein may be used to form structures for a wide variety of devices and/or purposes which may or may not be related to the illustrative aspects listed herein. Further, the methods presented herein may be carried out in any desired environment. Moreover, greater or fewer operations than those shown in FIG. 2 may be included in method 200, according to various aspects of inventive concepts described herein. It should also be noted that any of the aforementioned features may be used in any of the aspects described in accordance with the various methods.

Part (f) of FIG. 2 depicts a structure, an aerogel 234 as formed by method 200, in accordance with one embodiment. As an option, the present aerogel 234 may be implemented in conjunction with features from any other embodiment listed herein, such as those described with reference to the other FIGS. Of course, however, such aerogel 234 and others presented herein may be used in various applications and/or in permutations which may or may not be specifically described in the illustrative embodiments listed herein. Further, the aerogel 234 presented herein may be used in any desired environment.

FIG. 2 depicts a schematic diagram of a method 200 of forming an aerogel 234 as shown in step (f). The steps of method 200 are illustrated in parts (a) through (f) of FIG. 2, according to one inventive concept.

Part (a) illustrates the components resorcinol R, formaldehyde F that form an RF polymer chain 204. Part (a) also include a drawing of a triblock copolymer 206 (e.g., Pluronic F127) that have a characteristic 202 to form triblock copolymer micelles 208.

Part (b) of FIG. 2 illustrates a mixture 210 of the components of part (a). The mixture 210 includes a solvent 212 with the RF polymer chains 204 and triblock copolymer 206. In some approaches, the mixture 210 is a RF solution. In some approaches, the solvent 212 may be an aqueous solution.

Part (c) illustrates the effect 209 of adding a base catalyst 207 into the mixture 210. As shown in the illustration, the triblock polymer 206 form micelles 208. Mixing in a base catalyst 207 into the mixture 210 of the triblock polymer 206 as micelles 208 and the RF polymer chain 204 causes the mixture to form a hydrogel. The micelles 208 and RF polymers 204 in the solution with base catalyst 207 becomes a printable ink 216. In various approaches, the base catalyst is critical for forming a hydrogel with the triblock polymer micelles 208 and RF polymers 204, where the hydrogel is a form of a printable ink 216.

Part (d) illustrates a process 218 of forming a 3D printed structure 224 (e.g. 3D printed sol) with the ink 216 of part (c). The ink may be extruded from a nozzle 220 forming ligaments 214 of a printed 3D structure 224 on a substrate 222.

Part (e) illustrates the resulting 3D-printed gel 228 following a step-wise process 226 of thermal gelation and supercritical drying of the 3D printed sol structure 224 of part (d). As shown the step-wise process 226 of thermal gelation and supercritical drying, water is removed from the structure thereby resulting in a dried printed 3D structure 228. As shown, the dried printed 3D structure is comprised of a composite 230 of RF polymer chains 204 including a soft template of copolymer micelles 208.

Part (f) is an illustration of the final product of a carbon aerogel 234 following annealing 232 of the dried printed 3D structure 228 of step (e). In some approaches, the annealing 232 of the dried 3D structure 228 is a carbonization step. In some approaches, the annealing 232 of the dried 3D structure 228 removes the triblock copolymers from the structure. The triblock copolymers are thermoreversible, so the high heat of the carbonization step allows a reverse assembly of the triblock copolymer thereby removing the components from the structure.

In some approaches, the 3D printed structure has printed ligaments geometrically arranged. In some approaches, the printed ligaments are printed filaments. As shown in part (f) of FIG. 2 the carbon aerogel 234 has printed ligaments 233 geometrically arranged in a log-pile formation. In some approaches the geometrical arrangement may be determined by the process of additive manufacturing, e.g., direct ink writing. In some approaches, the aerogel 234 has a plurality of non-random pores 231 located between the geometrically arranged ligaments 233. In some approaches, the non-random pores 231 may be predefined, e.g., engineered to a defined diameter. In some approaches, the average diameter $d_l$ of the printed ligaments 233 may have a diameter $d_l$ of about 100 μm or less. In some approaches, the average diameter $d_l$ of the printed ligaments 233 may have a diameter $d_l$ of about 50 μm or less. In one approach, the average diameter $d_l$ of the printed ligaments 233 may have a diameter $d_l$ in a range of greater than 0 to less than about 10 μm.

In some approaches, the aerogel 234 may have a macro-periodic porosity In some approaches, the non-random pores 231 located between the geometrically arranged ligaments 233 have a defined length l. A center-to-center distance between the adjacent printed ligaments 233 may be measured as an average length l between adjacent printed ligaments 233. In some approaches, the adjacent printed ligaments 233 may be parallel to each other.

The macro-periodic porosity carbon aerogel 234 may be represented by the average length l between ligaments 233. In some approaches, the length l between adjacent printed ligaments 233 may be equal to the diameter $d_l$ of the printed ligaments 233. In some approaches, the length l between adjacent printed ligaments 233 may be greater than the diameter $d_l$ of the printed ligaments 233. In some approaches, the length l between adjacent printed ligaments 233 may be less than the diameter $d_l$ of the printed ligaments 233. In some approaches, the length l between adjacent printed ligaments 233 may be in a range of greater than about 100 μm and less than about 1 millimeter (mm).

In some approaches, the average diameter of the non-random pores 231 is equal to the length l between adjacent printed ligaments 233. In some approaches, the average diameter of non-random pores 231 of the aerogel 234 may be less than 100 μm. In some approaches, the average diameter of non-random pores 231 of the aerogel 234 may be greater than 0 μm to less than 50 μm. In some approaches, the average diameter of non-random pores 231 of the aerogel 234 may be greater than 0 μm to less than 10 μm.

In some approaches, each printed ligament 233 of the carbon aerogel 234 is comprised of a material 235 that includes plurality of carbon particles 236. In some approaches, each primary carbon particles 236 may have an average diameter $d_p$ in a range of about 2 nm to about 25 nm. Further, the carbon particles may be microporous, having a micropores within the particle of less than 2 nm.

In addition, the material 235 of the printed ligaments 233 may include a plurality of random pores p between the carbon particles 236. The random pores p may have an average diameter in a range of greater than about 2 nm to less than about 50 nm. In some approaches, the random pores p may have an average diameter in a range of greater than about 2 nm to less than about 10 nm. In some approaches, material 235 may be mesoporous.

The ink described herein forms printed ligaments having a material with porosity that extends from the surface throughout the ligament. In some approaches, the average diameter of the random pores located on a surface of the printed ligaments may be substantially equal to an average diameter of random pores located throughout an inside area of each of the printed ligaments, where the inside area is located between each surface of each of the printed ligaments.

In one exemplary approach, a carbon aerogel 234 may have macro-periodic porosity of geometrically arranged printed ligaments 233 having a random mesoporosity material 235 comprised of primary carbon particles 236 where each particle has random microporosity therein.

Figure 3:
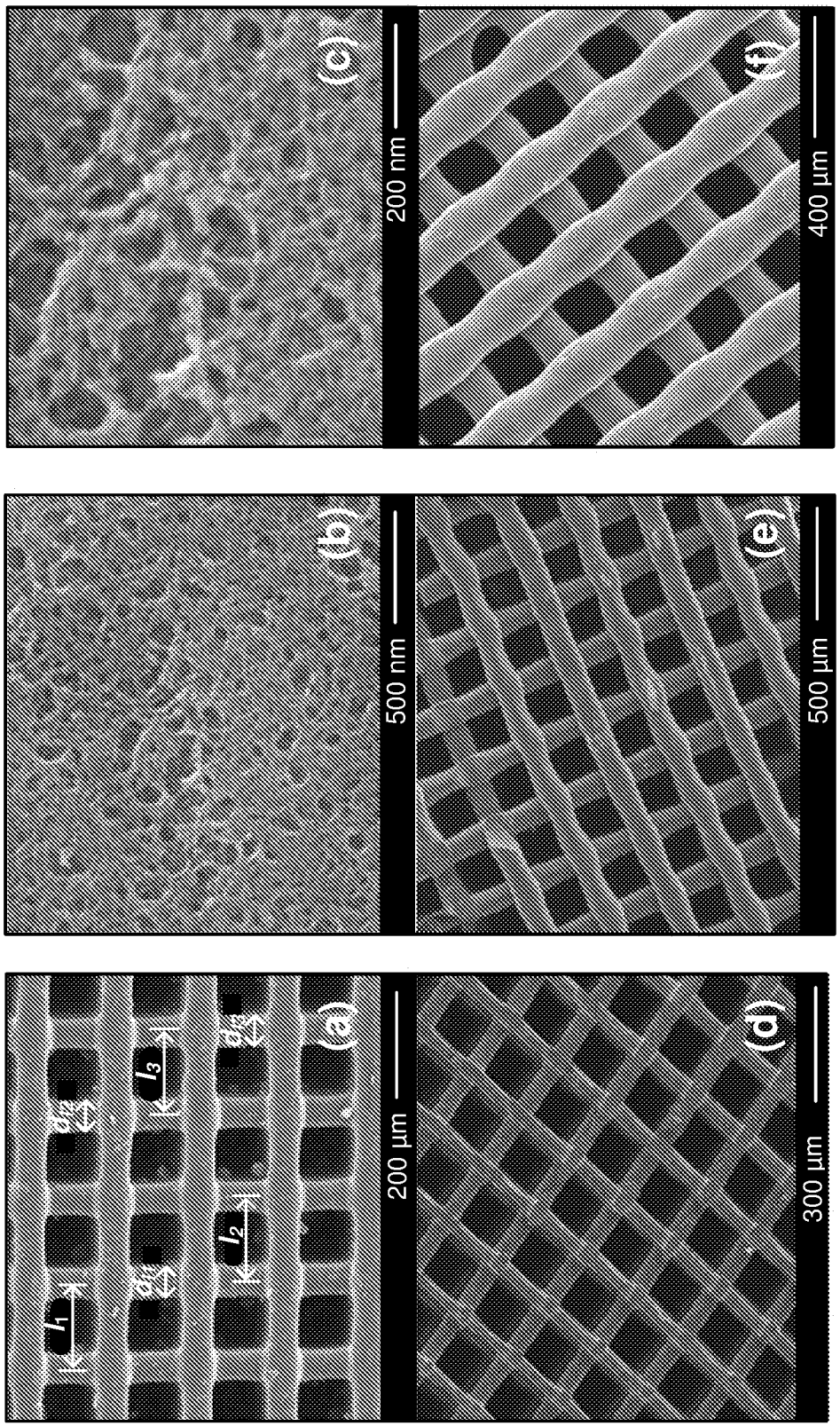
FIG. 3 is a series of scanning electron microscopy images of a three-dimensional printed structure, according to one inventive concept. Parts (a), (d), (e), and (f) are images at low magnification and parts (b) and (c) are images at high magnification.

The scanning electron microscopy (SEM) images of FIG. 3 show the macro-periodic porosity of a geometrically arranged printed ligaments. Parts (a), (d), (e), and (f) show images of geometrically arranged printed ligaments on the micron scale. For example only, and not meant to be limiting in any way, measurements of the printed structure in the image of part (a) are shown in Table 1. Three measurements of the diameter $d_l$ of the printed ligaments, and three measurements of a length l of the nonrandom pores as measured as the center-to-center distance between adjacent ligaments are shown in part (a) of FIG. 3, and listed in Table 1. As shown in the image of part (a) as an example of one approach, an average length l between adjacent ligaments may be about 103 μm, and the average diameter $d_l$ of the ligaments may be about 57 μm.

Parts (b) and (c) of FIG. 3 are SEM images of the material of the ligaments of the printed structure as shown in the lower magnified views of the structure (e.g., parts (a), (d), (e), and (f)). The images of parts (b) and (c) are magnified at a nanoscale level to show the random porosity of the material.

In some approaches, the surface area of the porous 3D printed carbon aerogel as described herein is comparable to the surface area of a monolith carbon aerogel made with conventional RF solution.

In some approaches, the carbon aerogel may include a metal oxide. In some approaches, the aerogel is a composite aerogel having metal oxide and carbon material. In some approaches, the carbon aerogel comprising a metal oxide is electrically conductive.

In Use

Functional porous carbon aerogels with engineered hierarchical architectures with high resolution have a diverse range of applications and potential within the fields of catalysis, energy storage, sorbent, filtration, and hydrogen evolution.

The inventive concepts disclosed herein have been presented by way of example to illustrate the myriad features thereof in a plurality of illustrative scenarios, embodiments, and/or implementations. It should be appreciated that the concepts generally disclosed are to be considered as modular, and may be implemented in any combination, permutation, or synthesis thereof. In addition, any modification, alteration, or equivalent of the presently disclosed features, functions, and concepts that would be appreciated by a person having ordinary skill in the art upon reading the instant descriptions should also be considered within the scope of this disclosure.

TABLE 1

Measurements of diameter of ligaments ($d_1$) and length of nonrandom pores (l) of part (a) of FIG. 3.

| | Measurements, microns (μm) | | | |
|---|---|---|---|---|
| | ($l_1, l_2, l_3; d_{l1}, d_{l2}, d_{l3}$) | | | |
| | 1 | 2 | 3 | Average |
| Length, l | 104.91 | 103.24 | 100.74 | 103 |
| Diameter, $d_1$ | 57.45 | 59.11 | 7 | 57 |

While various aspects of inventive concepts have been described above, it should be understood that they have been presented by way of example only, and not limitation. Thus, the breadth and scope of an aspect of the present invention should not be limited by any of the above-described exemplary approach, but should be defined only in accordance with the following claims and their equivalents.

What is claimed is:

1. An ink, comprising:
    a base catalyst;
    a sol gel precursor composition; and
    a block copolymer present in a concentration in a range of greater than 20 weight % to 60 weight % of total weight of the ink.

2. An ink as recited in claim 1, wherein the base catalyst includes sodium carbonate.

3. An ink as recited in claim 1, wherein the sol gel precursor composition comprises a hydroxyl benzene, an aldehyde, and a solvent.

4. An ink as recited in claim 1, wherein a ratio of the sol gel precursor composition to the base catalyst is in a range of 10 parts sol gel precursor composition to 1 part base catalyst (10:1) to 1000 parts sol gel precursor composition to 1 part base catalyst (1000:1).

5. An ink as recited in claim 1, wherein a concentration of the sol gel precursor composition is in a range of 1 weight % to 40 weight % of total weight of the ink.

6. An ink as recited in claim 1, wherein the block copolymer includes a triblock copolymer.

7. An ink as recited in claim 6, wherein the triblock copolymer is thermo-reversible.

8. An ink as recited in claim 1, where a concentration of the block copolymer is in a range of 30 weight % to 50 weight % of total weight of the ink.

9. An ink as recited in claim 1, wherein the ink is essentially free of particles.

10. An ink as recited in claim 1, comprising a metal oxide precursor, wherein the metal oxide precursor is a metal salt.

11. An ink as recited in claim 10, wherein the metal salt is selected from the group consisting of: copper nitride, cobalt nitride, nickel nitrate, and iron nitrate.

12. An ink as recited in claim 1, comprising a second ink, wherein the second ink includes graphene.

13. An ink as recited in claim 1, wherein the base catalyst is configured to form a hydrogel comprising the sol gen precursor composition and the block copolymer.

14. An ink as recited in claim 1, wherein the ink is a hydrogel.

15. An ink as recited in claim 1, wherein the ink does not include particles having an average diameter less than 1 nanometer.

16. An ink comprising:
    a base catalyst;
    a sol gel precursor composition; and
    a block copolymer,
    wherein a ratio of the sol gel precursor composition to the base catalyst is in a range of 10 parts sol gel precursor composition to 1 part base catalyst (10:1) to 1000 parts sol gel precursor composition to 1 part base catalyst (1000:1),
    where a concentration of the block copolymer is in a range of 30 weight % to 50 weight % of total weight of the ink.

17. An ink as recited in claim 16, comprising a second ink, wherein the second ink includes graphene.

18. An ink, comprising:
    a base catalyst;
    a sol gel precursor composition comprising a hydroxyl benzene, an aldehyde, and a solvent; and
    a block copolymer,
    where a concentration of the block copolymer is in a range of 30 weight % to 50 weight % of total weight of the ink.

* * * * *